US010037745B2

(12) United States Patent
Klement et al.

(10) Patent No.: US 10,037,745 B2
(45) Date of Patent: Jul. 31, 2018

(54) APPLYING AN APPLICATION-SPECIFIC AMBIENT LIGHT SETTING CONFIGURATION

(71) Applicant: MOTOROLA MOBILITY LLC, Chicago, IL (US)

(72) Inventors: Alexander Klement, West Dundee, IL (US); Kevin Dao, Skokie, IL (US); Ye Yang, Prior Lake, MN (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 15/176,901

(22) Filed: Jun. 8, 2016

(65) Prior Publication Data

US 2017/0358275 A1     Dec. 14, 2017

(51) Int. Cl.
*G09G 5/10* (2006.01)
*G06F 17/30* (2006.01)

(52) U.S. Cl.
CPC ......... *G09G 5/10* (2013.01); *G06F 17/30864* (2013.01); *G09G 2320/029* (2013.01); *G09G 2320/0606* (2013.01); *G09G 2320/0653* (2013.01); *G09G 2320/08* (2013.01); *G09G 2330/023* (2013.01); *G09G 2354/00* (2013.01); *G09G 2360/144* (2013.01); *G09G 2370/022* (2013.01)

(58) Field of Classification Search
CPC ....... G06T 15/506; G06T 15/50; G06T 15/60; G06T 15/80; G06T 15/06
See application file for complete search history.

(56) References Cited

U.S. PATENT DOCUMENTS

| 7,236,154 | B1* | 6/2007 | Kerr | G06F 1/1616 |
| | | | | 345/102 |
| 2009/0085922 | A1* | 4/2009 | Harris | G09G 3/002 |
| | | | | 345/556 |
| 2010/0079426 | A1* | 4/2010 | Pance | G06T 11/001 |
| | | | | 345/207 |
| 2010/0103190 | A1* | 4/2010 | Graf | G09G 3/20 |
| | | | | 345/600 |
| 2013/0128119 | A1* | 5/2013 | Madathodiyil | H04N 21/4852 |
| | | | | 348/563 |
| 2014/0160099 | A1* | 6/2014 | Li | G09G 3/36 |
| | | | | 345/207 |
| 2015/0049630 | A1* | 2/2015 | Kritt | H04W 48/18 |
| | | | | 370/254 |

* cited by examiner

*Primary Examiner* — Todd Buttram
(74) *Attorney, Agent, or Firm* — Yudell Isidore PLLC (57) ABSTRACT

A method, system and computer program product applying an application profile to a display configuration of a device, which overrides the default ambient light setting (ALS) data associated with a display. The method includes detecting initiation of an application. The method further includes searching at least one database for an application profile associated with the application. The application profile includes application-specific ALS data, which establishes an application-specific configuration of the display while the application is open on the display. In response to locating the application profile within the at least one database, the application profile is applied to the display, with the application-specific ALS data replacing/overriding the default ALS data.

20 Claims, 6 Drawing Sheets

APPLYING AN APPLICATION-SPECIFIC AMBIENT LIGHT SETTING CONFIGURATION

BACKGROUND

1. Technical Field

The present disclosure generally relates to electronic devices and in particular to a method for adjusting brightness levels associated with an electronic display.

2. Description of the Related Art

Many modern mobile devices are configured with an automatic brightness setting that adapts a current brightness of a display based on a detected ambient light level in a current environment. For example, in a dark room the brightness of the display may be automatically reduced. Similarly, under direct sunlight the brightness of the display may be automatically increased and/or maximized. However, current automatic brightness solutions only adapt based on a detected brightness of an ambient environment.

BRIEF DESCRIPTION OF THE DRAWINGS

The description of the illustrative embodiments is to be read in conjunction with the accompanying drawings, wherein.

DETAILED DESCRIPTION

The illustrative embodiments provide a method, system, and computer program product for applying an application profile to a display configuration of a device, which overrides the default ambient light setting (ALS) data associated with the display. The method includes detecting initiation of an application. The method further includes searching at least one database for an application profile associated with the application. The application profile includes application-specific ALS data, which establishes an application-specific configuration of a display of the device while the application is open on the device's display. In response to locating the application profile within the at least one database, the application profile is applied to a display of the device, with the application-specific ALS data replacing/overriding the default ALS data.

The above contains simplifications, generalizations and omissions of detail and is not intended as a comprehensive description of the claimed subject matter but, rather, is intended to provide a brief overview of some of the functionality associated therewith. Other systems, methods, functionality, features, and advantages of the claimed subject matter will be or will become apparent to one with skill in the art upon examination of the following figures and the remaining detailed written description. The above as well as additional objectives, features, and advantages of the present disclosure will become apparent in the following detailed description.

In the following description, specific example embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various aspects are described which may be aspects for some embodiments but not other embodiments.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be provided its broadest interpretation given the context in which that term is utilized.

Figure 1:
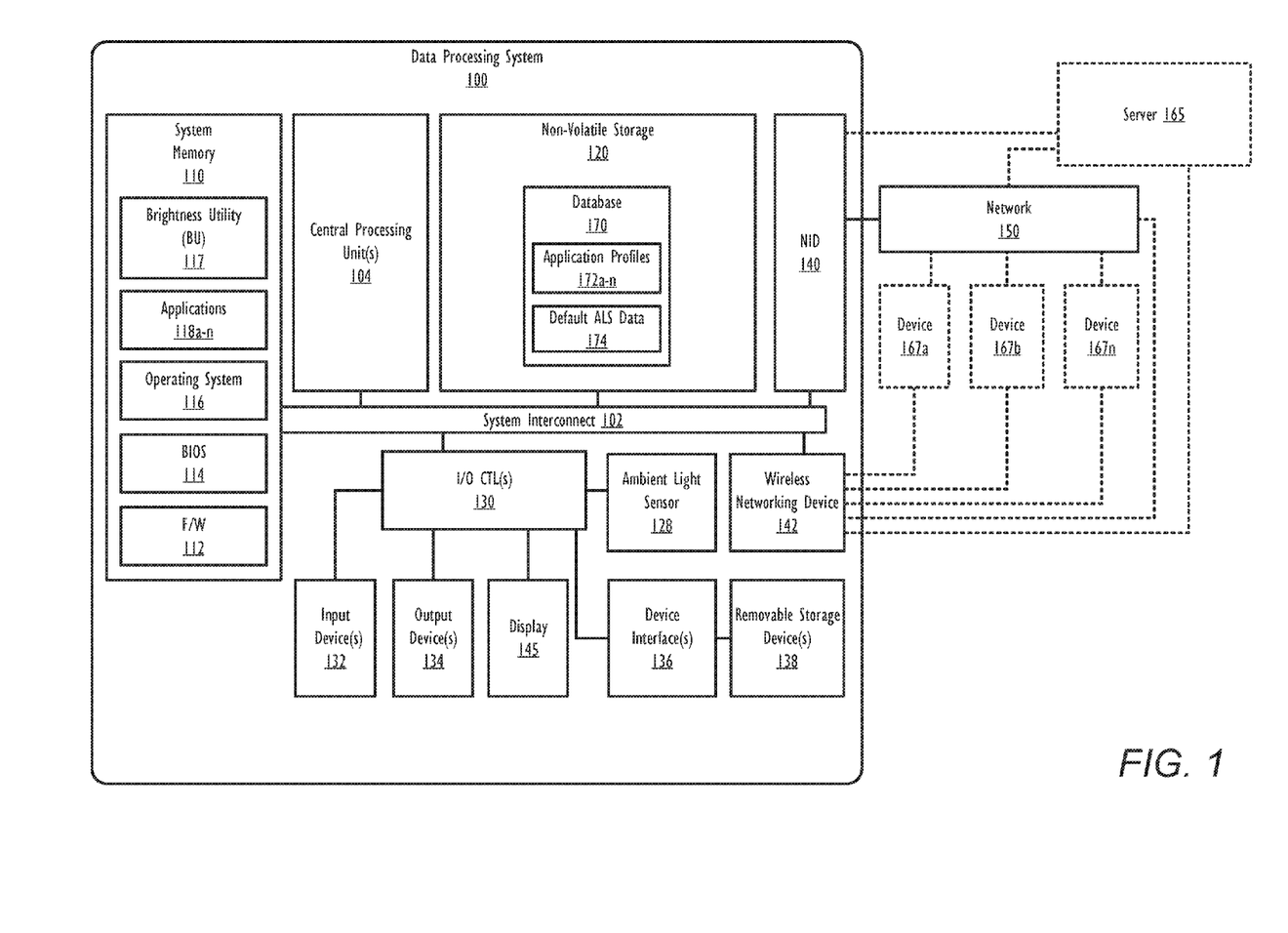
FIG. 1 provides a block diagram representation of an example data processing system within which certain aspects of the disclosure can be practiced, in accordance with one or more embodiments.

Those of ordinary skill in the art will appreciate that the hardware components and basic configuration depicted in the following figures may vary. For example, the illustrative components within data processing system 100 are not intended to be exhaustive, but rather are representative to highlight components that can be utilized to implement the present disclosure. For example, other devices/components may be used in addition to, or in place of, the hardware depicted. The depicted example is not meant to imply architectural or other limitations with respect to the presently described embodiments and/or the general disclosure.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments.

With reference now to the figures, and beginning with FIG. 1, there is depicted a block diagram representation of an example data processing system (DPS) 100, within which one or more of the described features of the various embodiments of the disclosure can be implemented. In one embodiment, DPS 100 can be any electronic device such as, but not limited to, a desktop computer, notebook computer, mobile phone, smart watch, camera, video recorder, or tablet.

DPS 100 includes at least one processor or central processing unit (CPU) 104 coupled to system memory 110 and non-volatile storage 120 via system interconnect 102. System interconnect 102 can be interchangeably referred to as a system bus, in one or more embodiments. One or more software and/or firmware modules can be loaded into system memory 110 during operation of DPS 100. Specifically, in one embodiment, system memory 110 can include therein a plurality of such modules, including one or more of firmware (F/W) 112, basic input/output system (BIOS) 114, operating system (OS) 116, brightness utility (BU) 117, and application(s) 118a-n. These software and/or firmware modules provide varying functionality when their corresponding program code is executed by CPU 104 or by secondary processing devices within DPS 100.

Database 170 may include application profiles 172a-n and default ALS data 174. While database 170 is illustrated as being included within non-volatile storage 120, in another embodiment, database 170 (or a copy thereof) may be located within system memory 110. In yet another embodiment, database 170 (or a copy thereof) may be located within removable storage device(s) 138, and/or a storage of a remote device (e.g. device 167a-n or server 165) that is communicatively connected to DPS 100. Default ALS data 174 establishes a default display brightness setting for at least one display (e.g., display 145) of DPS 100 at each of a plurality of ambient light levels. Default ALS data 174 may include a brightness curve, brightness table, and/or brightness algorithm that associates each of a plurality of ambient light levels with a particular brightness level for display 145. Application profiles 172a-n establish alternate display brightness settings for at least one display of DPS 100, which are customized based on at least one application and/or user interactions with DPS 100. According to one aspect of the disclosure, application profiles 172a-n may be different from the display brightness setting established by default ALS data 174. In one or more embodiments, application profiles 172a-n may be generated by BU 117 from application data stored in database 170, as described in greater detail in FIG. 4, below. In another embodiment, at least one of application profiles 172a-n is included within applications 118a-n, and/or is saved to database 170 during an installation or initialization process.

BU 117 executes within DPS 100 to perform the various methods and functions described herein. In one or more embodiments, BU 117 is a display configuration module. In another one or more embodiments, BU 117 may automatically apply at least one of application profiles 172a-n to DPS 100, which overrides default ALS data 174 utilized by at least one display (e.g., display 145) of DPS 100. For simplicity, BU 117 is illustrated and described as a stand-alone or separate software/firmware/logic component, which provides the specific functions and methods described herein. However, in at least one embodiment, BU 117 may be a component of, may be combined with, or may be incorporated within firmware of DPS 100, or within the OS 116, and/or within one or more of applications 118a-n.

DPS 100 further includes one or more input/output (I/O) controllers 130, which support connection to ambient light sensor 128. Ambient light sensor 128 measures an amount of light in a current environment of DPS 100. I/O controllers 130 also support connection by and processing of signals from one or more connected input device(s) 132, such as a keyboard, mouse, hardware button(s), touch screen, infrared (IR) sensor, fingerprint scanner, or microphone. I/O controllers 130 also support connection with and forwarding of output signals to display 145 and to one or more other output devices 134, such as additional monitors/displays and audio speaker(s). Additionally, in one or more embodiments, one or more device interfaces 136, such as an optical reader, a universal serial bus (USB), a card reader, Personal Computer Memory Card International Association (PCMIA) slot, and/or a high-definition multimedia interface (HDMI), can be associated with DPS 100. Device interface(s) 136 can be utilized to enable data to be read from or stored to corresponding removable storage device(s) 138, such as a compact disk (CD), digital video disk (DVD), flash drive, or flash memory card. In one or more embodiments, device interfaces 136 can further include General Purpose I/O interfaces, such as an Inter-Integrated Circuit ($I^2C$) Bus, System Management Bus (SMBus), and peripheral component interconnect (PCI) buses.

DPS 100 further includes a network interface device (NID) 140 and wireless networking device (WND) 142 that enables DPS 100 and/or components within DPS 100 to communicate and/or interface with other devices, services, and components that are located external to DPS 100. In one embodiment, DPS 100 may directly connect to one or more of these external devices, such as server 165 and devices 167a-n, via NID 140. In one or more embodiments, DPS 100 may utilize WND 142 to connect, via a wireless connection, to one or more of these external devices, independently from, or in combination with, NID 140. These externally located devices, services, and components can also interface with DPS 100 via an external network, such as example network 150, using one or more communication protocols. Network 150 can be a local area network, wide area network, personal area network, and the like, and the connection to and/or between network and DPS 100 can be wired or wireless or a combination thereof. For purposes of discussion, network 150 is indicated as a single collective component for simplicity. However, it is appreciated that network 150 can comprise one or more direct connections to other devices as well as a more complex set of interconnections as can exist within a wide area network, such as the Internet.

In one or more embodiments, DPS 100 may operate as a wireless communication device and WND 142 may be used to transmit data over a wireless network (e.g., a Wireless Fidelity (Wi-Fi) network, cellular network, Bluetooth® network (including Bluetooth® low energy (BLE) networks), a wireless ad hoc network (WANET), or personal area network (PAN)). In one embodiment, DPS 100 may be further equipped with an infrared (IR) device (not pictured) for communicating with other devices (e.g., devices 167a-n) using an IR connection. In another embodiment, WND 142 may be a short-range wireless device, including, but not limited to, a near field communication (NFC) device.

Figure 2:
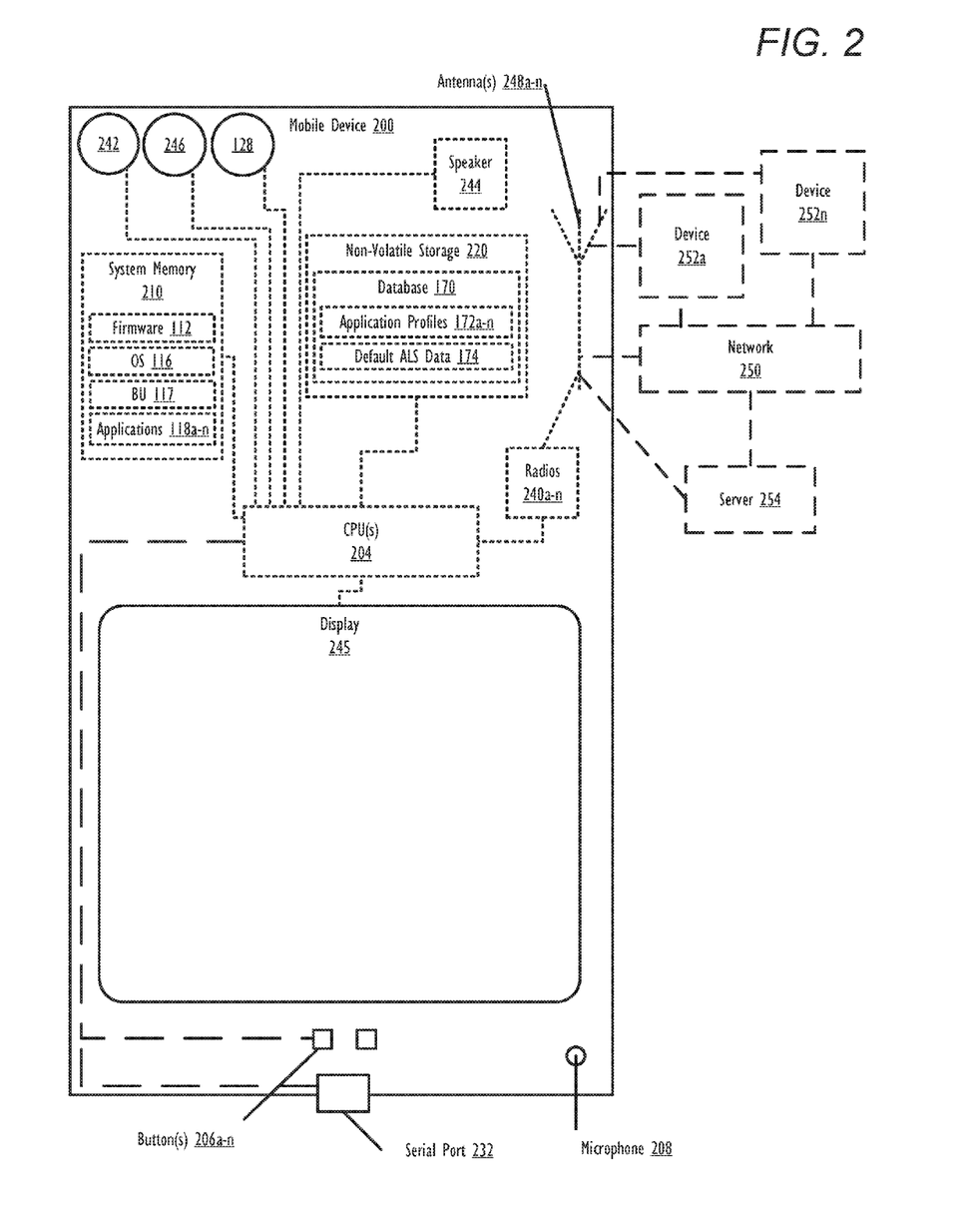
FIG. 2 illustrates a mobile device within which certain aspects of the disclosure can be practiced, in accordance with one or more embodiments.

Now turning to FIG. 2 which illustrates an example mobile device 200 within which one or more of the described features of the various embodiments of the disclosure can be implemented. Mobile device 200 includes at least one processor or central processing unit (CPU) 204. CPU 204 is coupled to system memory 210 and/or non-volatile storage 220, within which firmware 112, BU 117, Applications 118a-n, and database 170 can be stored for execution on CPU 204. According to one aspect, BU 117 executes within mobile device 200 to perform the various methods and functions described herein. For simplicity, BU 117 is illustrated and described as a stand-alone or separate software/firmware/logic component, which provides the specific functions and methods described below.

As shown, mobile device 200 comprises several input devices and output devices that enable a user to interface with mobile device 200. In the illustrated embodiment, mobile device 200 includes ambient light sensor 128, camera sensor 242, camera flash 246, display 245, hardware buttons 206a-n, microphone 208, and speaker 244. In one embodiment, at least one of camera sensor 242 and microphone 208 may be used independently or in conjunction with each other to capture audio, image, and/or video media. Microphone 208 may be used to receive spoken input/commands from a user. Speaker 244 is used to output audio. In another embodiment, mobile device 200 may not include ambient light sensor 128, instead camera sensor 242 may be configured to detect/measure an amount of ambient light in a current environment.

Hardware buttons 206a-n are selectable buttons which are used to receive manual/tactile input from a user to control specific operations of mobile device 200 and/or of applications executing thereon. In one embodiment, hardware buttons 206a-n may also include or may be connected to one or more sensors (e.g. a fingerprint scanner) and/or be pressure sensitive. Hardware buttons 206a-n may also be directly associated with one or more functions of a graphical user interface (not pictured) and/or functions of an OS, application, or hardware of mobile device 200. In one embodiment, hardware buttons 206a-n may include a keyboard.

Mobile device 200 also includes display 245, which is capable of displaying text, media content, and/or a graphical user interface (GUI) of firmware and/or one or more applications executing on mobile device 200. In one or more embodiments, display 245 may be an organic light-emitting diode (OLED) display. In one embodiment, display 245 is a touch screen that is also capable of receiving touch input from a user of mobile device 200 while interfacing with a displayed GUI. The GUI can be rendered by CPU 204 for viewing on display 245. In one embodiment, the GUI may include a virtual keyboard for receiving touch input in combination with display 245. In at least one embodiment, mobile device 200 can include a plurality of virtual buttons or affordances that operate in addition to or in lieu of hardware buttons 206a-n. For example, mobile device 200 can be equipped with a touch screen interface and provide a virtual keyboard or other virtual icons for user interfacing therewith.

Mobile device 200 also includes serial port 232 (e.g., a USB (universal serial bus) port) which can operate as one of an input port, an output port, and a combination input/output port. Serial port 232 allows a direct physical connection to and communication of data with a second device. In one embodiment, serial port 232 may also connect to a power charger (not pictured) for charging a battery (not pictured) of mobile device 200. Mobile device may also include components for wireless (inductive) charging of the battery.

Mobile device 200 also includes one or more wireless radios 240a-n and can include one or more antenna(s) 248a-n that enable mobile device 200 to wirelessly connect to, and transmit and receive voice communication and/or data with, one or more other devices, such as devices 252a-n and server 254. As a wireless device, mobile device 200 can transmit data over a wireless network 250 (e.g., a Wi-Fi network, cellular network, Bluetooth® network (including Bluetooth® low energy (BLE) networks), a wireless ad hoc network (WANET), or personal area network(PAN)). In one embodiment, mobile device 200 may be further equipped with an infrared (IR) device (not pictured) for communicating with other devices using an IR connection. In another embodiment, wireless radios 240a-n may include a short-range wireless device, including, but not limited to, a near field communication (NFC) device. In still another embodiment, mobile device 200 may communicate with one or more other device(s) using a wired or wireless USB connection.

Figure 3:
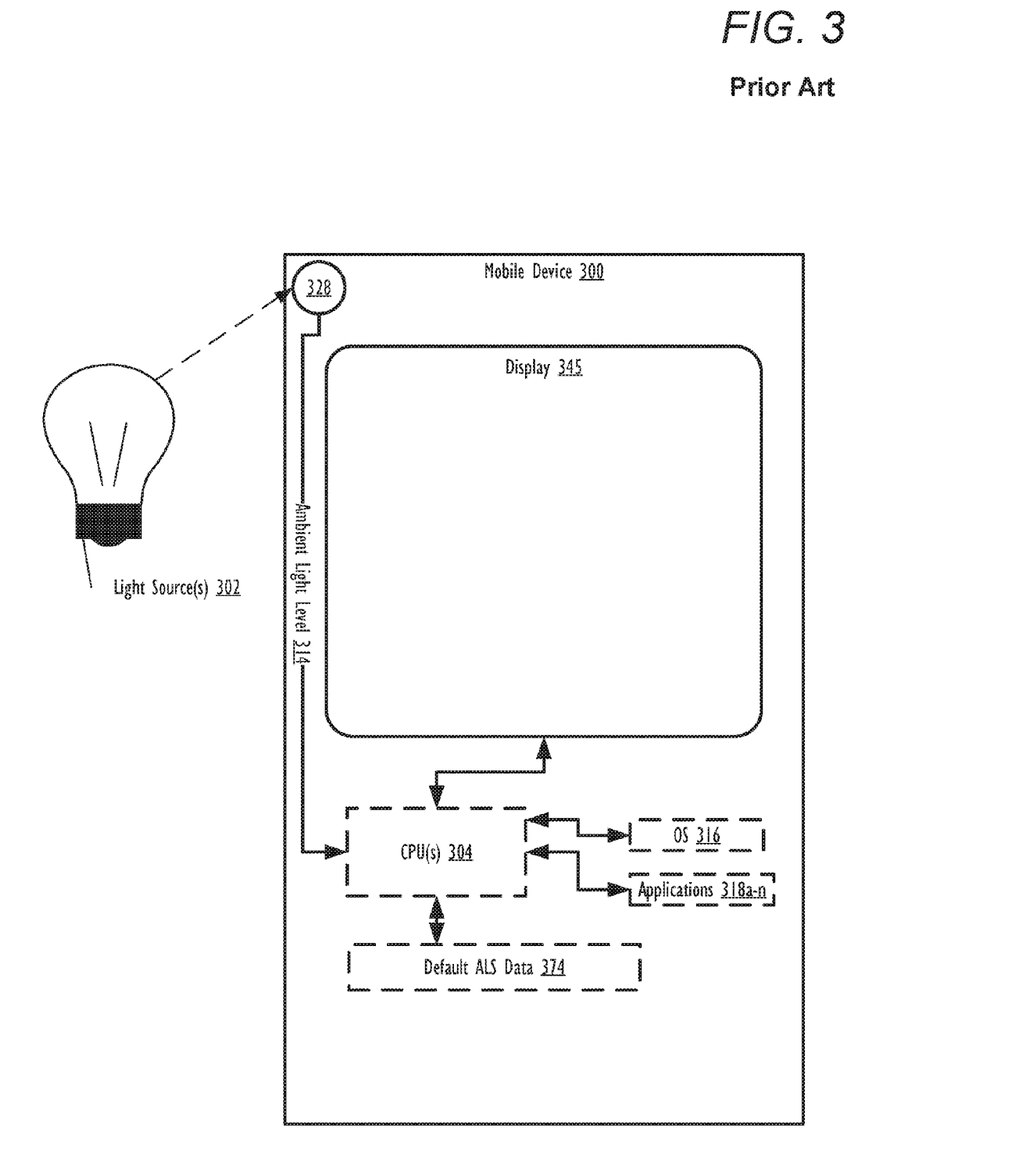
FIG. 3 illustrates a mobile device that is configured to dynamically adapt a current brightness of a display based on a current ambient light level, in accordance with the prior art.

FIG. 3 is a block diagram illustrating a mobile device which dynamically adapts a current brightness of a display based on a current ambient light level, in accordance with the prior art. It should be noted that mobile device 300 may be configured as a generic data processing system, mobile device, or another electronic device that includes the functional hardware and software illustrated in FIG. 3. Mobile device 300 includes CPU(s) 304, OS 316, Applications 318a-n, and default ALS data 374. OS 316, Applications 318a-n, and default ALS data 374 may be stored within a non-volatile storage (not pictured) and/or a system memory (not pictured) of mobile device 300. Default ALS data 374 establishes default brightness settings for display 345 at each of a plurality of ambient light levels. Default ALS data 374 may include a brightness curve, brightness table, and/or brightness algorithm that associates each of a plurality of ambient light levels with a particular display brightness level.

Mobile device 300 detects an amount/level of light (ambient light level 314) being emitted from surrounding light source(s) 302 in real time via ambient light sensor 328. In response to detecting ambient light level 314, mobile device 300 reads default ALS data 374 and identifies a display brightness level within default ALS data 374 that corresponds to the detected ambient light level 314. Mobile device 300 may then apply the identified display brightness level to display 345, which may increase or decrease the brightness of display 345 from a current brightness setting.

For example, when the current ambient light level in an environment darkens (e.g., when a user of mobile device 300 enters a dark room from a brighter environment) the brightness of display 345 may be automatically reduced/minimized. In another example, when the current ambient light level in the environment brightens (e.g., when a user of mobile device 300 enters direct sunlight from a darker indoor environment) the brightness of display 345 may be automatically increased/maximized. Thus, the prior art provides dynamically adjusting a brightness of display 345 based entirely on a detected current ambient light level provided from light source(s) 302. It should be noted that light source(s) 302 may include artificial light sources (e.g., a light bulb) or natural light sources (e.g., the sun).

Figure 4:
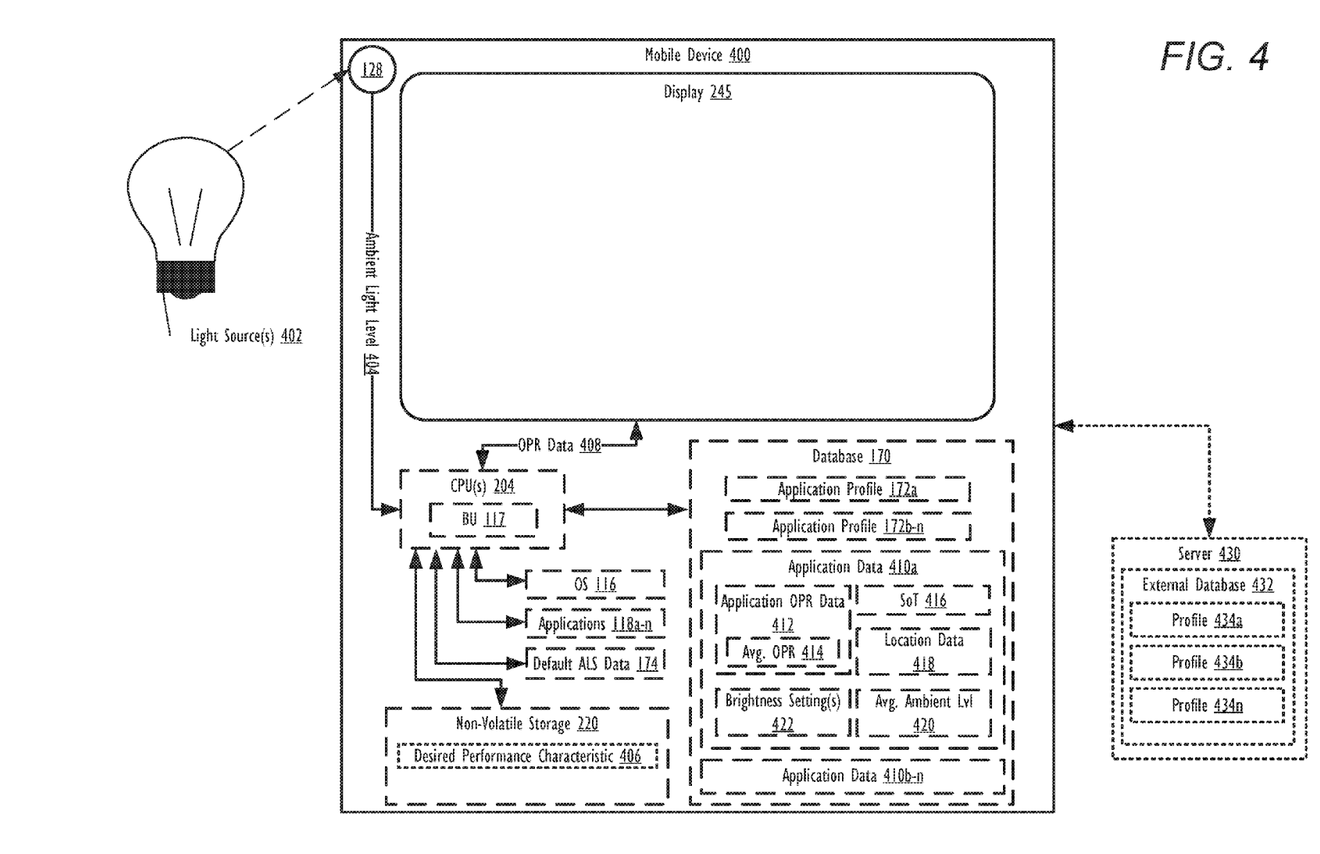
FIG. 4 illustrates a mobile device configured to apply an application profile to a display, which overwrites default ambient light setting (ALS) data associated with the display, in accordance with one or more embodiments.

FIG. 4 is a block diagram illustrating a mobile device which applies an application profile that overwrites default ALS data with application-specific ALS (ASALS) data associated with a display of the mobile device, in accordance with one or more embodiments. It should be noted that mobile device 400 may be configured as DPS 100, mobile device 200, or another electronic device that includes the functional hardware and software components to execute BU 117. For consistency in the description thereof, mobile device is assumed to be similar to mobile device 200 and include similar components. Mobile device 400 includes CPU(s) 204, ambient light sensor 128, non-volatile storage 220, database 170, and software/firmware modules and data, including OS 116, BU 117, applications 118a-n, and default ALS data 174. In one or more embodiments, OS 116, BU 117, Applications 118a-n, default ALS data 174, and/or database 170 may be stored within non-volatile storage 220, removable storage (not pictured), and/or a system memory (e.g., system memory 210 of FIG. 2) of mobile device 400.

Mobile device 400 detects the initiation of an application (e.g., application 118a) from among applications 118a-n. In one embodiment, the initiation of application 118a occurs when CPU(s) 204 begins execution of application 118a. In still another embodiment, the initiation of application 118a occurs when CPU(s) 204 begins graphical rendering of application 118a for view on display 245. In response to detecting the initiation of application 118a, mobile device 400 determines whether database 170 contains an application profile (e.g., application profile 172a) that is associated with application 118a from among application profiles 172a-n. Each of application profiles 172a-n is associated with a corresponding one of applications 118a-n and includes ASALS data which establishes a configuration for display 245 that is specific to that application. Each application profile 172 establishes a brightness characteristic for a corresponding application 118 for at least one ambient light level to achieve specific effects on the displayed application screen. In response to locating application profile 172a within database 170, mobile device 400 automatically applies application profile 172a to display 245, which overrides a current ALS data (default ALS data 174) for which display 245 is normally configured to use.

In response to being unable to locate application profile 172a within database 170, mobile device 400 may apply default ALS data 174 to display 245. According to one embodiment, BU 117, in response to applying default ALS data 174, triggers mobile device 400 to initiate a learning stage which includes a pre-determined amount of time (e.g., several days) during which on-pixel ratio (OPR) data 408 of display 245 is continuously or periodically collected by BU 117 and recorded to application data 410a-n. OPR data 408 provides a real-time categorization of a visual content that is currently viewable on display 245. OPR data 408 may include real-time color illumination/saturation readings for red, green, and blue colors viewable on display 245. OPR data 408 may also include a combined reading that includes red, green, and blue colors. OPR data 408 does not identify particular visual content that is being displayed, but rather categorizes a brightness characteristic associated with the visual content. Mostly white image content will result in a higher OPR ratio, while mostly dark/black image content will result in a lower OPR ratio. For example, during display of application 118a, which is an email application containing mostly white image content, display 245 may provide an OPR ratio of approximately 90%. Conversely, during display of application 118b, which is a game application containing mostly dark image content, display 245 may provide an OPR ratio of approximately 40%.

During the learning stage, BU 117, executing on CPU(s) 204, also monitors screen-on time (SoT) 416 of each of applications 118a-n. SoT 416 includes at least one active time period during the learning stage in which a corresponding application (e.g., application 118a) was viewable on display 245. In response to determining SoT 416, BU 117 may determine application OPR data 412 for each of applications 118a-n. Application OPR data 412 of an application (e.g., application 118a) includes only those portions of OPR data 408 that correspond to SoT 416 for that application. Application OPR data 412 for each application (e.g., application 118a) is recorded to and associated with corresponding application data 410a-n.

In response to the pre-determined time period associated with the learning stage expiring, BU 117 calculates average OPR 414 of application 118a based on application OPR data 412. Average OPR 414 categorizes an overall average OPR of application 118a during SoT 416. For example, a particular messaging application may have recorded, within application OPR data 412, OPR ratios within a range from 20% to 95% with an average OPR 414 of 82% across SoT 416.

In response to determining average OPR 414 for each of applications 118a-n, BU 117 automatically generates application profiles 172a-n for each of applications 118a-n. The generated application profiles 172a-n include ASALS data, which establishes application-specific configuration(s) for display 245 based on average OPR 414 and any usage data stored within a corresponding application data 410a-n. In one embodiment, the average OPR 414 may be further compared to one or more values/thresholds. For example, in response to determining average OPR 414 is above a first value/threshold, the performance level within the ASALS data of application profile 172a may be established to a first level, which first level increases a brightness level of display 245 to a first brightness level over a default brightness level established by default ALS data 174. Additionally, in response to determining average OPR 414 is below a second value/threshold that is less than the first value/threshold, the performance level within the ASALS data of application profile 172a may be established to a second level that decreases the brightness level of display 245 to a second brightness level under the default brightness level established by default ALS data 174.

Once application profile 172a has been generated, BU 117 dynamically adapts/configures display 245 to the particular performance level established by the ASALS data within application profile 172a for all future instances when application 118a is viewable on display 245. For example, in response to application 118a being viewable on display 245, BU 117 automatically applies application profile 172a to display 245, which increases a brightness level of display 245 to an increased level over a default brightness level established by default ALS data 174. In another example, in response to application 118*b* (which is a game application) being viewable on display 245, BU 117 automatically applies application profile 172*b* to display 245, which decreases a brightness level of display 245 to a reduced brightness level under a default brightness level established by default ALS data 174. In one embodiment, if application 118*a* is not viewable or no longer or not currently viewable on display 245 (e.g., application 118*a* is a background application), ASALS data within application profile 172*a* is not applied to display 245. In one or more embodiments, BU 117 may automatically detect triggering of application 118*a* by detecting the launching of application 118*a* by name.

In another embodiment, during the learning stage, BU 117 may also continually monitor an ambient light level 404 associated with light source(s) 402 via ambient light sensor 128. Ambient light level 404 is a real-time value that identifies a brightness of light source(s) 402. Light source(s) 402 may include artificial light sources (e.g., a light bulb) or natural light sources (e.g., the sun). BU 117 may then record, within application data 410*a-n*, the average ambient light level 420, which identifies an average brightness of light source(s) 402 during SoT 416 of a corresponding application 118. Average ambient light level 420 may then be considered during the generation/calculation of the corresponding application profile (e.g., application profile 172*a*) for a particular application (e.g. application 118*a*). In another embodiment, BU 117 may also determine a minimum and/or maximum ambient light level during the SoT 416 for each of applications 118*a-n*. The determined minimum and/or maximum ambient light level may also be stored to application data 410*a-n*.

In another embodiment, during the learning stage, BU 117 may also detect and record any brightness settings 422 received as an input from a user of mobile device 400. For example, brightness settings 422 may include a first instance where a user of mobile device 400 changed the brightness level of display 245 to 75% and a second instance where the user changed the brightness level of display 245 to 65% during times when application 118*a* was viewable on display 245 (i.e., during SoT 416). Brightness settings 422 may then be considered during the generation/calculation of corresponding application profile 172*a* for application 118*a*. For example, during generation of application profile 172*a*, BU 117 may determine, from brightness settings 422, whether a user is continually requesting a specific brightness of display 245 during SoT 416 of application 118*a*. In response to an affirmative determination, BU 117 may further modify/update the ASALS data within application profile 172*a* to establish a performance level for display 245 that is consistent with the continually requested specific brightness of display 245 by the user of mobile device 400 during display of that application.

In another embodiment, during the learning stage, BU 117 may also record location data 418 that identifies a physical location of mobile device 400. In this embodiment, using a global positioning satellite (GPS) device (not pictured), BU 117 continuously tracks location data 418 associated with mobile device 400. BU 117 may then record, within application data 410*a*, location data 418 that identifies location(s) of mobile device 400 during the learning stage. Location data 418 may then be considered during the generation/calculation of corresponding application profile 172*a* for application 118*a*. For example, BU 117 may determine, from location data 418, at least one location where mobile device 400 was used during the learning stage. In one embodiment, the detected location(s) may require display 245 to be configured with an increased brightness or decreased brightness based on detected ambient light at the location(s) and user modification. BU 117 may configure application profile 172*a* in part to maximize performance or battery life of display 245 when mobile device is located in the determined location(s) based on the location data. In one or more embodiments, BU 117 may correlate the location data with ambient light level at the location(s), a time of day when mobile device 400 is at the location(s), and user modifications to maximize performance or battery life of display 245 when mobile device is located in the determined location(s).

In another embodiment, mobile device 400 may receive, via at least one input device, an input from a user that identifies desired performance characteristic 406. In one embodiment, the received desired performance characteristic 406 may indicate a user desires a highest performance setting (e.g., highest brightness and/or contrast ratio) of mobile device 400 and/or display 425. In another embodiment the received desired performance characteristic 406 may indicate a user desires a particular performance setting that provides increased battery life (which may, for example, also reduce the brightness level of display 425. In one or more other embodiments, desired performance characteristic 406 may indicate an intermediate setting between the highest performance setting and the highest performance savings and/or lowest battery consumption. In one embodiment, performance characteristic 406 may be associated with a particular application from among applications 118*a-n*. In this embodiment, desired performance characteristic 406 may then be considered by BU 117 during the generation/calculation of application profile 172*a* for application 118*a* such that the performance of mobile device 400 is further maximized/optimized based on the desired performance characteristic 406. In another embodiment, performance characteristic 406 may be associated with multiple applications from among applications 118. In this embodiment, desired performance characteristic 406 may then be considered by BU 117 during the generation/calculation of each of application profiles 172*a-n* such that the performance of each of applications 118*a-n* is further maximized/optimized based on the desired performance characteristic 406.

In another embodiment, after the expiration of the learning stage, BU 117 may continue to record at least one of application OPR data 412, SoT 416, location data 418, and brightness settings 422. In this embodiment, BU 117 may also continue to calculate average OPR 414 and average ambient light level 420. BU 117 may then continually adjust/recalculate application profiles 172*a-n* in real time based on additional data added to application data 410*a-n* after the expiration of the learning stage. In another embodiment, BU 117 may adjust/recalculate application profiles 172*a-n* at regular intervals based on additional data added to application data 410*a-n* after the expiration of the learning stage.

In one embodiment, BU 117 may detect a first lifetime initiation/launch of applications 118*a-n*. In response to detecting the first lifetime initiation/launch of at least one particular application, BU 117 may initiate the learning stage. For example, application 118*a* may be a setup program that launches on a first powering-on of mobile device 400. In response to detecting a first lifetime initiation/launch of application 118*a*, BU 117 may automatically initiate the learning stage.

In another embodiment, mobile device 400 may be communicatively connected to server 430 having external database 432. External database 432 may contain profiles 434a-n, each of which corresponds to a particular type/category of application (e.g., games, streaming video applications, messaging applications, productivity/email applications) and which includes ASALS data that may be applied to a configuration of display 245 to optimize performance of display 245 and/or reduce battery drain of display 245 for the particular type/category of application. In one embodiment, in response to being unable to locate a specific application, for example application profile 172a, that is associated with application 118a within database 170, BU 117 initiates the learning stage and also automatically identifies a type/category associated with application 118a and retrieve a profile (e.g. profile 434a) from among profiles 434a-n, that is associated with the same type/category of application as application 118a. In an associated embodiment, BU 117 may identify the type/category associated with application 118a by reading header information and/or identifying information within the application. In an alternate embodiment, BU 117 may connect to an application service/store (not pictured) and retrieve a description that identifies the type/category associated with application 118a. Profile 434a may then be downloaded from external database 432 and applied to display 245 in lieu of default ALS data 174. In response to determining the learning stage has completed, BU 117 may automatically apply application profile 172a to display 245, which overwrites profile 434a.

In one or more of the embodiments above, BU 117 generates an application profile 172a-n for each of applications 118a-n that had a recorded SoT during the learning stage. However, it should also be noted that in another embodiment, application profiles 172a-n may be combined into a single application profile 172 that contains ASALS data for display 245 for each of applications 118a-n. In this embodiment, the combined profile may be applied to display 245 in response to detecting initiation of an application from among each of applications 118a-n. In another embodiment, the combined profile may be applied to display 245 based on a particular location of mobile device 400 and/or a time of day.

Figure 5:
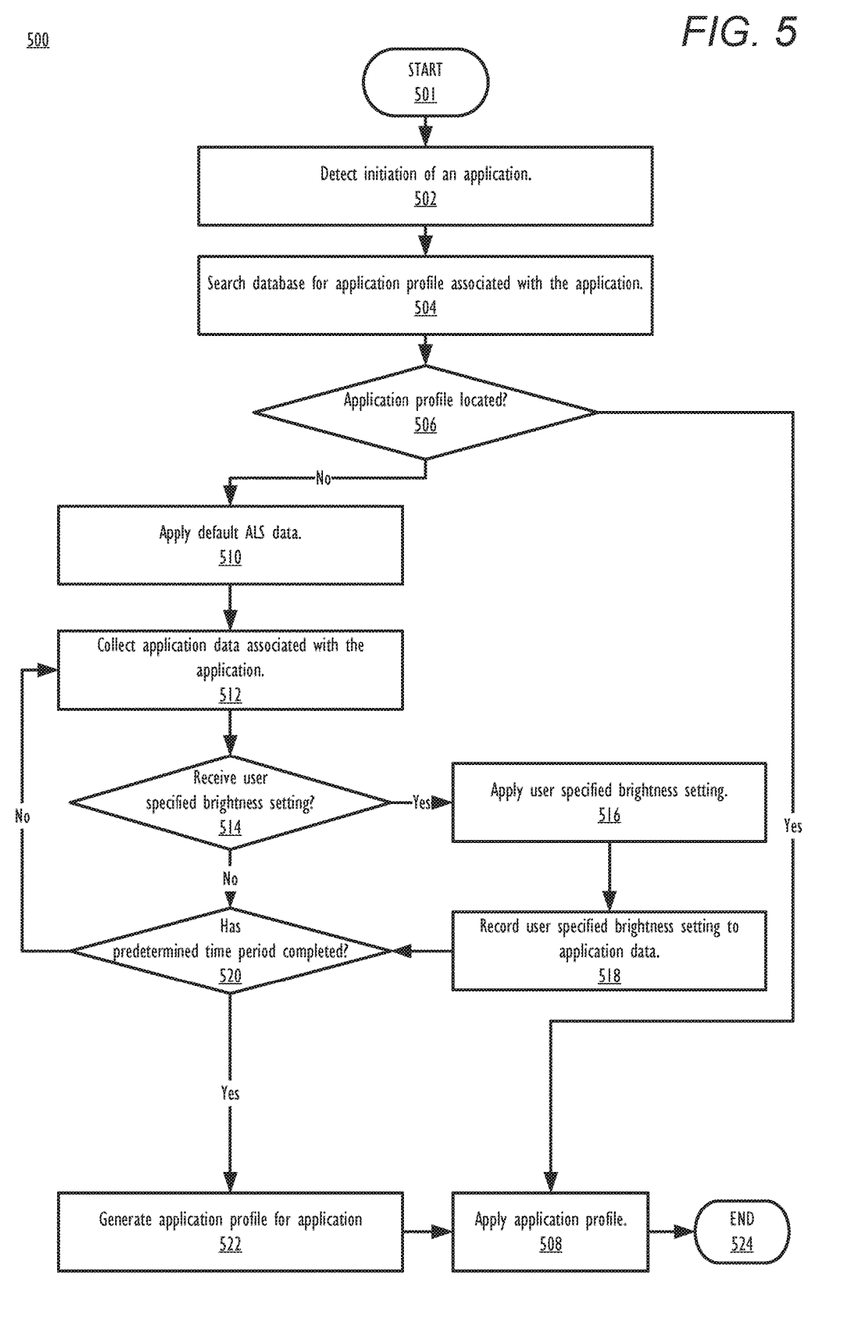
FIG. 5 is a flow chart illustrating a method for applying an application profile that overwrites a default ALS data associated with a display of a device, in accordance with one or more embodiments.

Referring now to FIG. 5, there is depicted a high-level flow-chart illustrating a method by which a device applies an application profile that overwrites default ALS data associated with a display of the device with an ASALS, in accordance with one or more embodiments of the present disclosure. Aspects of the method are described with reference to the components of FIGS. 1-2 and 4. Several of the processes of the method provided in FIG. 5 can be implemented by a processor (e.g., CPU 104 or CPU 204) executing software code of BU 117 within a generic data processing system (e.g., FIG. 1) or mobile device (e.g., FIG. 2 and/or FIG. 4). The method processes described in FIG. 4 are generally described as being performed by mobile device 400.

Method 500 commences at initiator block 501 then proceeds to block 502. At block 502, BU 117 executing on a processor of mobile device 400 detects initiation of application 118a. In response, to detecting initiation of application 118a, mobile device 400 searches database 170 for an application profile (application profile 172a) that is associated with application 118a (block 504). At block 506, it is determined whether an application profile associated with application 118a, has been located. In response to determining application profile 172a has been located, the method proceeds to block 508, and application profile 172a and specifically ASALS data is applied to control certain aspects/features of display 245. Method 500 then terminates at end block 524.

In response to being unable to locate application profile 172a, method 500 proceeds to block 510 and default ALS data is applied to display 245. At block 512, a learning stage is initiated, and application data (application data 410a), including OPR data 408 of display 245, is continuously collected/recorded. At block 514, it is determined whether user-specified brightness settings (brightness settings 422) have been received. In response to determining brightness settings 422 have been received, brightness settings 422 are applied (block 516) and recorded to application data 410a (block 518). The method then proceeds to block 520.

In response to determining brightness settings 422 have not been received, method 500 proceeds to block 520 and it is determined whether the pre-determined time period associated with the learning stage has expired. In response to determining the pre-determined time period associated with the learning stage has not expired, method 500 continues back to block 512. In response to determining the pre-determined time period associated with the learning stage has expired, method 500 continues to block 522. At block 522, application profile 172a is generated from application data 410a. Method 500 then proceeds to block 508 where generated application profile 172a is applied to display 245. Method 500 then terminates at end block 524.

Figure 6:
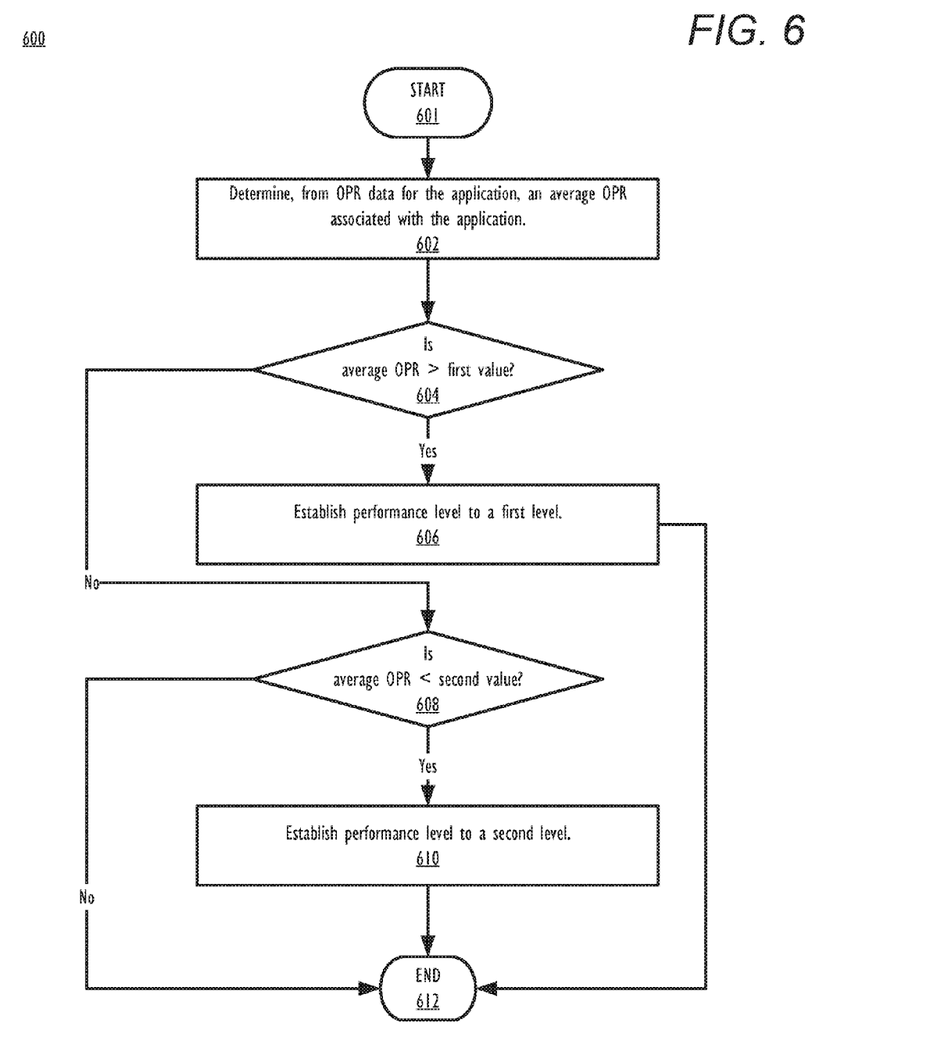
FIG. 6 is a flow chart illustrating a method for generating an application profile based on an average on-pixel ratio (OPR) of a display during a pre-determined time period, in accordance with one or more embodiments.

Referring now to FIG. 6, there is depicted a high-level flow-chart illustrating a method for generating an application profile based on an average OPR of a display of a device during a pre-determined time period, in accordance with one or more embodiments of the present disclosure. Aspects of the method are described with reference to the components of FIGS. 1-2 and 4. Several of the processes of method 600 provided in FIG. 6 can be implemented by a processor (e.g., CPU 104 or CPU 204) executing software code of respective BU 117 within a generic data processing system (e.g., FIG. 1) or mobile device (e.g., FIG. 2 and/or FIG. 4). The method processes described in FIG. 5 are generally described as being performed by mobile device 400.

Method 600 commences at initiator block 601, then proceeds to block 602. At block 602, mobile device 400, executing BU 117, determines average OPR 414 for application 118a based on recorded application OPR data 412. At block 604, it is determined whether average OPR 414 is greater than a first predetermined threshold/value. In response to determining average OPR 414 is greater than the first threshold/value, a performance level within the ASALS data of application profile 172a is established at a first level (block 606). The first level corresponds to an increased brightness level of display 245 over a default brightness level established by the default ALS data 174. Method 600 then ends at block 612

In response to determining average OPR 414 is not greater than the first predetermined threshold/value at block 604, method 600 continues to block 608 and it is determined whether average OPR 414 is less than a second pre-determined threshold/value. In response to determining average OPR 414 is greater than the first predetermined threshold/value at block 604, method 600 ends at block 612. In response to determining average OPR 414 is less than the second threshold/value, the performance level within the ASALS data of application profile 172a is established at a second level (block 610). The second level corresponds to a decreased brightness level of display 245 that is less than a default brightness level established by the default ALS data 174. Method 600 then ends at block 612.

In the above-described flow charts, one or more of the method processes may be embodied in a computer readable device containing computer readable code such that a series of steps are performed when the computer readable code is executed on a computing device. In some implementations, certain steps of the methods are combined, performed simultaneously or in a different order, or perhaps omitted, without deviating from the scope of the disclosure. Thus, while the method steps are described and illustrated in a particular sequence, use of a specific sequence of steps is not meant to imply any limitations on the disclosure. Changes may be made with regards to the sequence of steps without departing from the spirit or scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, or other programmable data processing apparatus to produce a machine that performs the method for implementing the functions/acts specified in the flowchart and/or block diagram block or blocks. The methods are implemented when the instructions are executed via the processor of the computer or other programmable data processing apparatus.

As will be further appreciated, the processes in embodiments of the present disclosure may be implemented using any combination of software, firmware, or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device can include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

While the disclosure has been described with reference to example embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the scope thereof. Therefore, it is intended that the disclosure not be limited to the particular embodiments disclosed for carrying out this disclosure, but that the disclosure will include all embodiments falling within the scope of the appended claims.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A method comprising:
   detecting initiation of an application on a device;
   searching at least one database comprising a plurality of preexisting application profiles for an application profile that is associated with the application, wherein the application profile is associated with the application and includes application-specific ambient light setting (ASALS) data which establishes an application-specific configuration of a display of the device while the application is being presented on the display;
   in response to being unable to locate the application profile within the at least one database:
     collecting on-pixel ratio (OPR) data of the display over a time period during which the application is being presented on the display, wherein the OPR data categorizes a visual content of the display;
     storing the OPR data to application data associated with the application within the at least one database; and
     generating, from the application data, the application profile for the application; and
   in response to locating the application profile within the at least one database, automatically applying the application profile to the device, wherein applying the application profile overrides a default ambient light setting (ALS) data associated with the display with the ASALS data.

2. The method of claim 1, further comprising:
in response to being unable to locate the application profile within the at least one database, applying the default ALS data to the device, wherein the default ALS data establishes a default configuration of the display for the application.

3. The method of claim 1, wherein generating the application profile further comprises:
determining, from the application data, an average OPR of the display during an aggregate screen-on time of the application during a pre-determined time period;
in response to determining the average OPR is above a first value, establishing a performance level within the ASALS data of the application profile to a first level which increases a brightness level of the display to a first brightness level over a default brightness level established by the default ALS data; and
in response to determining the average OPR is below a second value which is less than the first value, establishing the performance level within the ASALS data of the application profile to a second level which decreases the brightness level of the display to a second brightness level under the default brightness level.

4. The method of claim 1, further comprising:
receiving, from a user of the device, identification of a desired performance characteristic of the display from among: (i) a first performance characteristic that minimizes power consumption of the display and (ii) a second performance characteristic that maximizes a brightness of the display; and
incorporating the received performance characteristic within the application data.

5. The method of claim 1, further comprising:
continuously monitoring additional data associated with operation of the device, wherein the additional data includes data from a group comprising:
a received brightness setting for the display;
a detected ambient light level;
location data; and
a screen-on time associated with the application, wherein the screen-on time identifies at least one active time period during which the application is viewable on the display; and
incorporating the additional data within the application data.

6. The method of claim 1, wherein the ASALS data establishes a brightness level of the display for each of a plurality of ambient light levels.

7. The method of claim 1, wherein initiation of the application occurs when a processor of the device begins graphically rendering the application for view on the display.

8. A device comprising:
a memory;
a display; and
a processor that is coupled to the memory and which executes a display configuration module that configures the processor to perform display configuration measures, wherein:
the display configuration module:
detects initiation of an application;
searches at least one database comprising a plurality of preexisting application profiles for an application profile that is associated with the application, wherein the application profile is associated with the application and includes application-specific ambient light setting (ASALS) data which establishes an application-specific configuration of the display while the application is being presented thereon;
in response to being unable to locate the application profile within the at least one database:
collects on-pixel ratio (OPR) data of the display over a time period during which the application is being presented on the display, wherein the OPR data categorizes a visual content of the display;
stores the OPR data to application data associated with the application within the at least one database; and
generates, from the application data, the application profile for the application; and
in response to locating the application profile within the at least one database, applies the application profile to the device, wherein applying the application profile overrides a default ambient light setting (ALS) data associated with the display with the ASALS data.

9. The device of claim 8, wherein the display configuration module:
in response to being unable to locate the application profile within the at least one database, applies the default ALS data to the device, wherein the default ALS data establishes a default configuration of the display for the application.

10. The device of claim 8, wherein the display configuration module:
determines, from the application data, an average OPR of the display during an aggregate screen-on time of the application during a pre-determined time period;
in response to determining the average OPR is above a first value, establishes a performance level within the ASALS data of the application profile to a first level which increases a brightness level of the display to a first brightness level over a default brightness level established by the default ALS data; and
in response to determining the average OPR is below a second value which is less than the first value, establishes the performance level within the ASALS data of the application profile to a second level which decreases the brightness level of the display to a second brightness level under the default brightness level.

11. The device of claim 8, further comprising an input device, wherein the display configuration module:
receives, from the input device, identification of a desired performance characteristic of the display from among: (i) a first performance characteristic that minimizes power consumption of the display and (ii) a second performance characteristic that maximizes a brightness of the display; and
incorporates the received performance characteristic within the application data.

12. The device of claim 8, further comprising a light sensor that detects an ambient light level within an environment of the device, wherein the display configuration module:
continuously monitors additional data associated with operation of the device, wherein the additional data includes data from a group comprising:
a received brightness setting for the display;
a detected ambient light level measured by the light sensor; and
a screen-on time associated with the application, wherein the screen-on time identifies at least one active time period during which the application is viewable on the display; and incorporates the additional data within the application data.

13. The device of claim 8, wherein the ASALS data establishes a brightness level of the display for each of a plurality of ambient light levels.

14. The device of claim 8, wherein initiation of the application occurs when the processor begins graphically rendering the application for view on the display.

15. A computer program product comprising:
a non-transitory computer readable storage device; and
program code on the computer readable storage device that when executed by a processor associated with a device having a display, the program code enables the device to provide the functionality of:
 detecting initiation of an application on the device;
 searching at least one database comprising a plurality of preexisting application profiles for an application profile associated with the application, wherein the application profile is associated with the application and includes application-specific ambient light setting (ASALS) data which establishes an application-specific configuration of the display while the application is being presented on the display;
 in response to being unable to locate the application profile within the at least one database:
  collecting on-pixel ratio (OPR) data of the display over a time period during which the application is being presented on the display, wherein the OPR data categorizes a visual content of the display;
  storing the OPR data to application data associated with the application within the at least one database; and
  generating, from the application data, the application profile for the application; and
 in response to locating the application profile within the at least one database, applying the application profile to the device, wherein applying the application profile overrides a default ambient light setting (ALS) data associated with the display with the ASALS data.

16. The computer program product of claim 15, wherein initiation of the application occurs when the processor begins graphically rendering the application for view on the display.

17. The computer program product of claim 15, the program code further comprising code for:
 in response to being unable to locate the application profile within the at least one database, applying the default ALS data to the device, wherein the default ALS data establishes a default configuration of the display for the application.

18. The computer program product of claim 15, wherein the program code for generating the application profile further comprises code for:
 determining, from the application data, an average OPR of the display during an aggregate screen-on time of the application during a pre-determined time period;
 in response to determining the average OPR is above a first value, establishing a performance level within the ASALS data of the application profile to a first level which increases a brightness level of the display to a first brightness level over a default brightness level established by the default ALS data; and
 in response to determining the average OPR is below a second value which is less than the first value, establishing the performance level within the ASALS data of the application profile to a second level which decreases the brightness level of the display to a second brightness level under the default brightness level.

19. The computer program product of claim 15, wherein the program code for generating the application profile further comprises code for:
 receiving, from a user of the device, identification of a desired performance characteristic of the display from among: (i) a first performance characteristic that minimizes power consumption of the display and (ii) a second performance characteristic that maximizes a brightness of the display; and
 incorporating the received performance characteristic within the application data.

20. The computer program product of claim 15, wherein the program code for generating the application profile further comprises code for:
 continuously monitoring additional data associated with operation of the device, wherein the additional data includes data from a group comprising:
  a received brightness setting for the display;
  a detected ambient light level;
  location data; and
  a screen-on time associated with the application, wherein the screen-on time identifies at least one active time period during which the application is viewable on the display; and
 incorporating the additional data within the application data.

* * * * *